July 29, 1958
R. L. WILLISTON
2,845,384
DISTILLATION OF CYCLOHEXANONE FROM MIXTURES CONTAINING CYCLOHEXANONE, CYCLOHEXANOL, AND WATER
Filed March 12, 1956
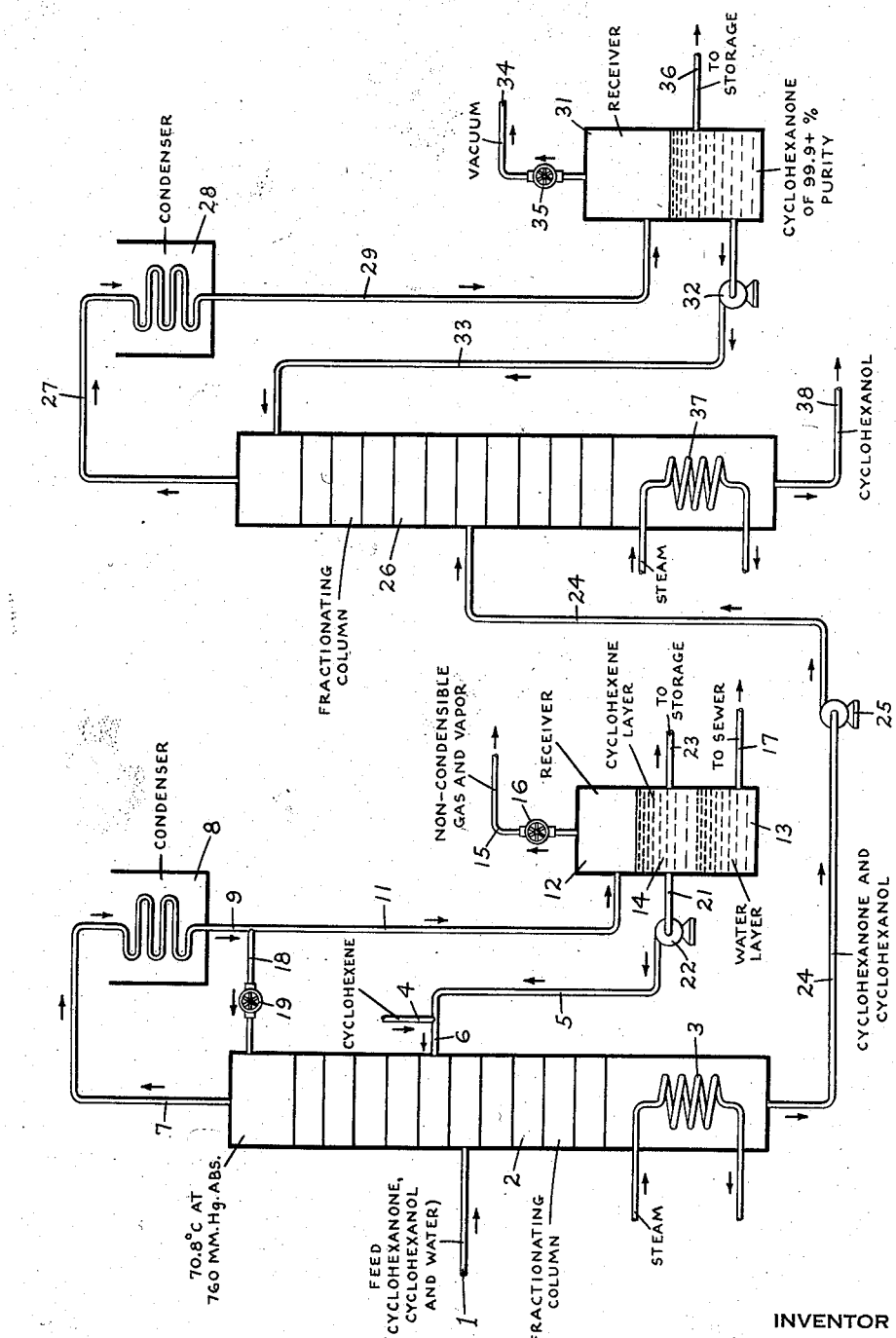
INVENTOR
ROBERT L. WILLISTON
BY
ATTORNEY

United States Patent Office 2,845,384
Patented July 29, 1958

2,845,384

DISTILLATION OF CYCLOHEXANONE FROM MIXTURES CONTAINING CYCLOHEXANONE, CYCLOHEXANOL, AND WATER

Robert L. Williston, Kenmore, N. Y., assignor to Allied Chemical Corporation, New York, N. Y., a corporation of New York Application March 12, 1956, Serial No. 570,891

4 Claims. (Cl. 202—42)

The invention relates to cyclohexanone and more particularly refers to a new and improved process for continuously separating cyclohexanone from mixtures containing it together with water and cyclohexanol to obtain a cyclohexanone product of high purity.

Cyclohexanone is commercially produced by vapor phase dehydrogenation of cyclohexanol at elevated temperatures over a zinc-copper catalyst. The crude product thus obtained usually contains over 90% of cyclohexanone and less than about 10% of impurities, notably cyclohexanol and water, as well as small amounts of phenol and by-product hydrocarbons such as cyclohexene.

Under ordinary pressure cyclohexanone and cyclohexanol boil within 5° of each other (155° C. and 160° C. respectively), and hence cannot be readily separated by distillation. However, under reduced pressures of less than 100 mm. Hg abs. these compounds possess sufficiently different volatilities, i. e. more widely different boiling points such as to permit fractional distillation. Water, as a component of the mixtures of cyclohexanone and cyclohexanol, complicates the situation in that water forms azeotropes with both cyclohexanone and cyclohexanol, which possess very close boiling points (96° C. and 98° C. respectively, at 760 mm. Hg abs.). Consequently, in view of the small difference in boiling points of these azeotropes, these substances cannot be readily separated by distillation as long as water is present in mixture therewith and it is necessary to remove water from the mixture prior to separation of the cyclohexanone in order to prevent contamination of the cyclohexanone with cyclohexanol.

Crude, wet cyclohexanone containing cyclohexanol and small amounts of other impurities may be distilled in a batch operation by first removing a forerun containing the water, hydrocarbon and other impurities which are separately collected and then fractionally distilling the residue in vacuo to separate the cyclohexanone. While the batch distillation is satisfactory for the separation of small amounts of cyclohexanone, for large volume operations, a continuous distillation process is more desirable and economical.

A continuous distillation process for purifying crude cyclohexanone has been suggested wherein a stream of crude cyclohexanone is introduced into a fractionating column, the water removed as overhead in the form of cyclohexanone-water and cyclohexanol-water azeotropes, while dehydrated, crude cyclohexanone is removed as bottoms. The overhead is condensed and stratified into two layers: The upper layer poor in water is returned to the first column, while the lower layer rich in water is introduced into a second column for removal of water. This involves the use of two continuous fractionation columns with their attendant accessories and requires recycling two wet fractions to the first column with increased formation of auto-condensation products due to long residence time. The dry, crude cyclohexanone from the first column is fractionated in a third column to remove cyclohexanol and other high boiling impurities.

An object of the present invention is to provide a continuous process for separating cyclohexanone in high yield and purify from crude, wet cyclohexanone containing cyclohexanol. Another object of the invention is to provide a continuous distillation process for purifying and separating cyclohexanone from crude, wet cyclohexanone containing cyclohexanol which is efficient in operation and economical in construction. Other objects and advantages will be apparent from the following description and accompanying drawing.

In accordance with the process of the present invention cyclohexanone in high yield and purity may be separated from crude, wet cyclohexanone containing cyclohexanol in a continuous operation by continuously feeding a stream of crude, wet cyclohexanone into a fractionating column, continuously introducing cyclohexene into said fractionating column, continuously removing as vapor from the top of the fractionating column as azeotrope composed of water and cyclohexene, continuously condensing said vapor azeotrope, continuously separating said condensate into an aqueous phase and an oil phase containing cyclohexene, returning cyclohexene from the oil phase to the fractionating column, continuously withdrawing dehydrated cyclohexanone containing cyclohexanol from the bottom of the fractionating column, continuously passing said dehydrated cyclohexanone-cyclohexanol to a second fractionating column maintained at an absolute pressure below 100 mm. Hg, continuously removing cyclohexanone vapor of high purity from the top of said second fractionating column, continuously condensing and collecting said pure cyclohexanone and continuously withdrawing cyclohexanol as bottoms from the bottom of the second fractionating column.

Referring to the drawing, the feed to the continuous distillation system entering through line 1 is crude, wet cyclohexanone which may be produced by dehydrogenation of cyclohexanol and is a mixture of 80–90% or more of cyclohexanone, usually about 5–10% cyclohexanol and about 0.5–3% water together with small amounts of other impurities such as phenols, polymers and hydrocarbons. In crude cyclohexanone produced by hydrogenation of phenol followed by dehydrogenation of resultant cyclohexanol the resultant crude product contains about 1–2% cyclohexene as an impurity. Fractionating column 2, into which feed enters through line 1, may be any suitable fractionating tower, preferably a column of the bubble cap type. Heat is provided in the bottom of fractionating column 2 by means of steam coil 3 or alternatively, not shown in the drawing, a conventional reboiler section. Fractionating column 2 is preferably operated at about atmospheric pressure, but may, although not a preferred method of operation, be operated at super-atmospheric or sub-atmospheric pressures. Cyclohexene from an external source entering through line 4, or recycled cyclohexene entering through line 5, is introduced through line 6 into fractionating column 2 wherein it forms an azeotrope with the water entering with the feed through line 1. This azeotrope, which boils at 70.8° C. at 760 mm. Hg abs. and contains about nine parts by weight of cyclohexene per part of water, is removed as overhead through line 7, condensed in water-cooled condenser 8 and the condensate then passes down through lines 9 and 11 into receiver 12 wherein the condensate collects and separates into a lower aqueous layer 13 and an upper oily layer 14 containing cylohexene. Non-condensible gases and vapors are released from the top of receiver 12 through line 15 and valve 16 and may be discharged to the atmosphere. The water from the phase separation, being virtually free from cyclohexene and other organic components, may be discarded through line 17 to sewer. A portion of the condensate flowing down through line 9 may be returned to the top of fractionating column 2 via line 18 and valve 19 to cool the top of the fractionating column and maintain it at the proper temperature. The total amount of cyclohexene introduced into column 2 as added cyclohexene entering through line 4, or recycled cyclohexene entering through line 5, or as an impurity in the crude cyclohexanone feed entering through line 1, should be sufficient to provide equilibrium conditions, viz. to remove essentially all of the water present in the crude, wet cyclohexanone feed as a cyclohexene-water azeotrope. If an insufficient amount of cyclohexene is introduced for a substantial length of time the cyclohexanone bottoms will contain an increased concentration of water. The presence of water in the bottoms when subsequently fractionated in the second column to separate cyclohexanone from cyclohexanol will cause cyclohexanol to distill over and contaminate the cyclohexanone product due to the formation of close-boiling azeotropes of these substances with water. Conversely, if substantially more cyclohexene is employed than is required to azeotrope the water, the excess will not be completely vaporized as overhead and will tend to contaminate the cyclohexanone bottoms. This in turn will result in contamination of the distilled cyclohexanone product from the second column. Cyclohexene need be supplied usually in the initial stages of operation from an external source and introduced into the fractionating column through line 4 as shown in the drawing. After equilibrium conditions are set up there will be sufficient cyclohexene in layer 14 from which the cyclohexene may be removed through line 21 and forced by pump 22 through lines 5 and 6 into tower 2. Any excess cyclohexene may be sent through line 23 to storage. The bottom of tower 2 is maintained at a temperature of about 155–165° C. by means of steam coil 3 to provide heat for distilling the azeotrope and to volatilize the water and other volatile constituents from the cyclohexanone-cyclohexanol bottoms collecting in the bottom of tower 2. In this manner water can be completely removed in a single column instead of requiring two columns as in the prior art. In addition, this provides a superior process due to simplification of procedure and equipment and reduction in amount of autocondensation by-products formed due to shorter exposure of the cyclohexanone to elevated temperatures.

The dehydrated cyclohexene-free crude cyclohexanone-cyclohexanol is continuously withdrawn from the bottom of column 2 through line 24 and directed by pump 25 into fractionating column 26, similar in construction to column 2 except it is usually provided with a greater number of bubble cap plates. Heat may be supplied to the bottom of tower 6 by means of a steam coil. Fractionating column 26 is operated under sub-atmospheric pressure of below about 100 mm. Hg abs., preferably below about 50 mm. Hg abs. The temperature in column 26 will vary depending upon the pressure but generally will be found to have a top temperature of about 70–90° C. and a bottom temperature of about 10° to 40° higher. Cyclohexanone vapors released from the top of column 26 through line 27 are condensed in condenser 28 and then flow through line 29 into receiver 31. A portion of the cyclohexanone condensate collecting in receiver 31 is returned by pump 32 through line 33 for refluxing and cooling into the top of tower 26. Vacuum is maintained on the system through line 34 and valve 35 connected to the top of receiver 31. High purity cyclohexanone collecting in receiver 31 is sent through line 36 to storage. The cyclohexanol bottoms collecting in fractionating column 26 and heated by steam coil 37 are withdrawn and sent to storage through line 38.

The following example illustrates the present invention:

A stream of 3258 lbs./hr. of wet crude cyclohexanone, which was obtained by dehydrogenation of cyclohexanol vapors over a zinc-copper catalyst and which possessed the following analysis: 92.2% cyclohexanone, 5.3% cyclohexanol, 1.4% cyclohexene, 0.5% water, 0.1% phenol and 0.5% condensation products—was fed into a 30 plate commercial bubble cap column at approximately the 15th plate. Sufficient cyclohexene was fed into the column at approximately the 15th plate to maintain the head temperature at 70.5–71° C. at 760 mm. Hg abs. This quantity is normally about 101 lbs./hr. and must be sufficient to give a total of 9 parts by weight of cyclohexene for each part of water in the feed. The column overhead with a rate of approximately 300 lbs./hr. was condensed in a suitable condenser, from which half of the condensate was returned to the top of the column as reflux while the other half was run to a phase separator, wherein it was automatically separated into a cyclohexene layer and a water layer. A portion of the cyclohexene layer, approximately 101 lbs./hr., was recycled to the column, the remainder being drawn off to storage. The water from the separator, equivalent to about 16 lbs./hr. and containing less than 0.1% organic compounds, was discarded to the sewer. Sufficient heat was continuously fed to the reboiler located at the bottom of the column to maintain a temperature of 160–162° C. The bottoms, containing all of the cyclohexanone, cyclohexanol and higher boiling compounds of the feed and less than 0.02% cyclohexene or water, were continuously withdrawn at a rate of approximately 3143 lbs./hr.

The bottoms from the dehydration column were fed continuously into a 60 plate bubble cap column maintained at a head pressure of 50 mm. Hg abs. In this second column cyclohexanone was removed overhead at a temperature of 76° C. while a residue rich in cyclohexanol was withdrawn as bottoms. The cyclohexanone product thus obtained was found on analysis to contain more than 99.95% cyclohexanone, less than 0.02% of water, cyclohexene or cyclohexanol and less than 50 p. p. m. of phenol.

Although certain preferred embodiments of the invention have been disclosed for purpose of illustration, it will be evident that various changes and modifications may be made therein without departing from the scope and spirit of the invention.

I claim:

1. A continuous process for separation and purification of cyclohexanone from cyclohexanone containing water and cyclohexanol as impurities which comprises continuously feeding a stream of impure cyclohexanone into a fractionating zone, continuously introducing cyclohexene into said fractionating zone to form an azeotrope with the water in said impure cyclohexanone, continuously removing as vapor from the fractionating zone the azeotrope composed of water and cyclohexene leaving dehydrated cyclohexanone containing cyclohexanol as bottoms in the fractionating zone, continuously condensing said vapor azeotrope, continuously withdrawing said dehydrated cyclohexanone containing cyclohexanol from the fractionating zone, passing said dehydrated cyclohexanone-cyclohexanol to a second fractionating zone maintained at an absolute pressure below about 100 mm. Hg, continuously removing cyclohexanone vapor of high purity from said second fractionating zone leaving cyclohexanol as bottoms in said second fractionating zone, continuously condensing and collecting said cyclohexanone of high purity, and continuously withdrawing cyclohexanol as bottoms from the second fractionating zone.

2. A continuous process for separation and purification of cyclohexanone from cyclohexanone containing water and cyclohexanol as impurities which comprises continuously feeding a stream of impure cyclohexanone into a fractionating zone, continuously introducing cyclohexene into said fractionating zone to form an azeotrope with the water in said impure cyclohexanone, continuously removing as vapor from the fractionating zone the azeotrope composed of water and cyclohexene leaving dehydrated cyclohexanone containing cyclohexanol as bottoms in the fractionating zone, continuously condensing said vapor azeotrope, continuously separating said condensate into an aqueous phase and an oil phase containing cyclohexene, continuously returning cyclohexene from the oil phase to the fractionating zone, continuously withdrawing said dehydrated cyclohexanone containing cyclohexanol from the fractionating zone, passing said dehydrated cyclohexanone-cyclohexanol to a second fractionating zone maintained at an absolute pressure below about 100 mm. Hg, continuously removing cyclohexanone vapor of high purity from said second fractionating zone leaving cyclohexanol as bottoms in said second fractionating zone, continuously condensing and collecting said cyclohexanone of high purity, and continuously withdrawing cyclohexanol as bottoms from the second fractionating zone.

3. A continuous process for separation and purification of cyclohexanone from cyclohexanone containing water, cyclohexanol and a minor amount of cyclohexene which comprises continuously feeding a stream of impure cyclohexanone into a fractionating zone, continuously introducing cyclohexene into said fractionating zone to form an azeotrope with the water in said impure cyclohexanone, continuously removing as vapor from the fractionating zone the azeotrope composed of water and cyclohexene leaving dehydrated cyclohexanone containing cyclohexanol as bottoms in the fractionating zone, continuously condensing said vapor azeotrope, continuously separating said condensate into an aqueous phase and an oil phase containing cyclohexene, continuously returning cyclohexene from the oil phase to the fractionating zone in an amount sufficient to maintain a proportion of about nine parts by weight of cyclohexene per part of water in the fractionating zone, discharging excess oil phase containing cyclohexene from the system, continuously withdrawing said dehydrated cyclohexanone containing cyclohexanol from the fractionating zone, passing said dehydrated cyclohexanone-cyclohexanol to a second fractionating zone maintained at an absolute pressure below about 100 mm. Hg, continuously removing cyclohexanone vapor of high purity from said second fractionating zone leaving cyclohexanol as bottoms in said second fractionating zone, continuously condensing and collecting said cyclohexanone of high purity, and continuously withdrawing cyclohexanol as bottoms from the second fractionating zone.

4. A continuous process for separation and purification of cyclohexanone from cyclohexanone containing water and cyclohexanol as impurities which comprises continuously feeding a stream of impure cyclohexanone into a fractionating zone maintained under substantial atmospheric pressure, continuously introducing cyclohexene into said fractionating zone to form an azeotrope with the water in said impure cyclohexanone, continuously removing as vapor from the fractionating zone the azeotrope composed of water and cyclohexene leaving dehydrated cyclohexanone containing cyclohexanol as bottoms in the fractionating zone, continuously condensing said vapor azeotrope, returning a portion of said condensate to the fractionating zone to maintain the temperature of the vapor leaving the fractionating zone at about 71° C., continuously separating said condensate into an aqueous phase and an oil phase containing cyclohexene, continuously returning cyclohexene from the oil phase to the fractionating zone in an amount sufficient to maintain a proportion of about nine parts by weight of cyclohexene per part of water in the fractionating zone, continuously withdrawing said dehydrated cyclohexanone containing cyclohexanol from the fractionating zone, passing said dehydrated cyclohexanone-cyclohexanol to a second fractionating zone maintained at an absolute pressure below about 100 mm. Hg, continuously removing cyclohexanone vapor of high purity from said second fractionating zone leaving cyclohexanol as bottoms in said second fractionating zone, continuously condensing and collecting said cyclohexanone of high purity, continuously returning a portion of said condensate as reflux to said second fractionating zone, and continuously withdrawing cyclohexanol as bottoms from the second fractionating zone.

References Cited in the file of this patent

UNITED STATES PATENTS

| 2,377,421 | Frey | June 5, 1945 |
| 2,552,911 | Steitz | May 15, 1951 |

OTHER REFERENCES

"Azeotropic Data," American Chemical Society, 1952.
"Elements of Fractional Distillation," Robinson and Gilliland, fourth edition, McGraw-Hill, 1950, chapter 10.
"Technique of Organic Chemistry," vol. 4; Distillation, Weissberger, chapter 3, Interscience 1950.